United States Patent
Rohde et al.

[11] 3,771,921
[45] Nov. 13, 1973

[54] REACTOR AIR PUMP DRIVE SYSTEM

[75] Inventors: Robert P. Rohde; Thomas W. Weisgerber, both of Saginaw, Mich.

[73] Assignee: General Motors Corporation, Detroit, Mich.

[22] Filed: Aug. 23, 1972

[21] Appl. No.: 283,081

[52] U.S. Cl............ 417/12, 60/307, 180/79.2 R, 417/216, 417/237, 417/374, 417/405, 417/426
[51] Int. Cl..................... F04b 49/00, B62d 5/10
[58] Field of Search.................. 417/12, 216, 237, 417/374, 405, 426; 180/79.2 R; 60/307

[56] References Cited
UNITED STATES PATENTS
2,467,398    4/1949    Miller ..................... 417/374 X
2,669,098    2/1954    Buell....................... 417/374 X Primary Examiner—Carlton R. Croyle
Assistant Examiner—Richard Sher
Attorney—J. L. Carpenter et al.

[57] ABSTRACT

A reactor air pump drive system in which the air pump of a vehicle air injection exhaust reactor system is normally driven during engine operation by a hydraulic motor actuated by hydraulic fluid from the power steering unit of the vehicle, the hydraulic motor driving the air pump through a one-way clutch. When the engine is turned off but it is desirable to continue air flow through a catalytic converter for an additional period of time, an electric motor is energized to drive the hydraulic motor and thus the air pump, the hydraulic motor being shifted to a zero displacement mode under this condition. Should the power steering system fail, the electric motor is energized to reverse drive the hydraulic motor for operation as a pump to thus provide a reserve power steering feature.

3 Claims, 5 Drawing Figures

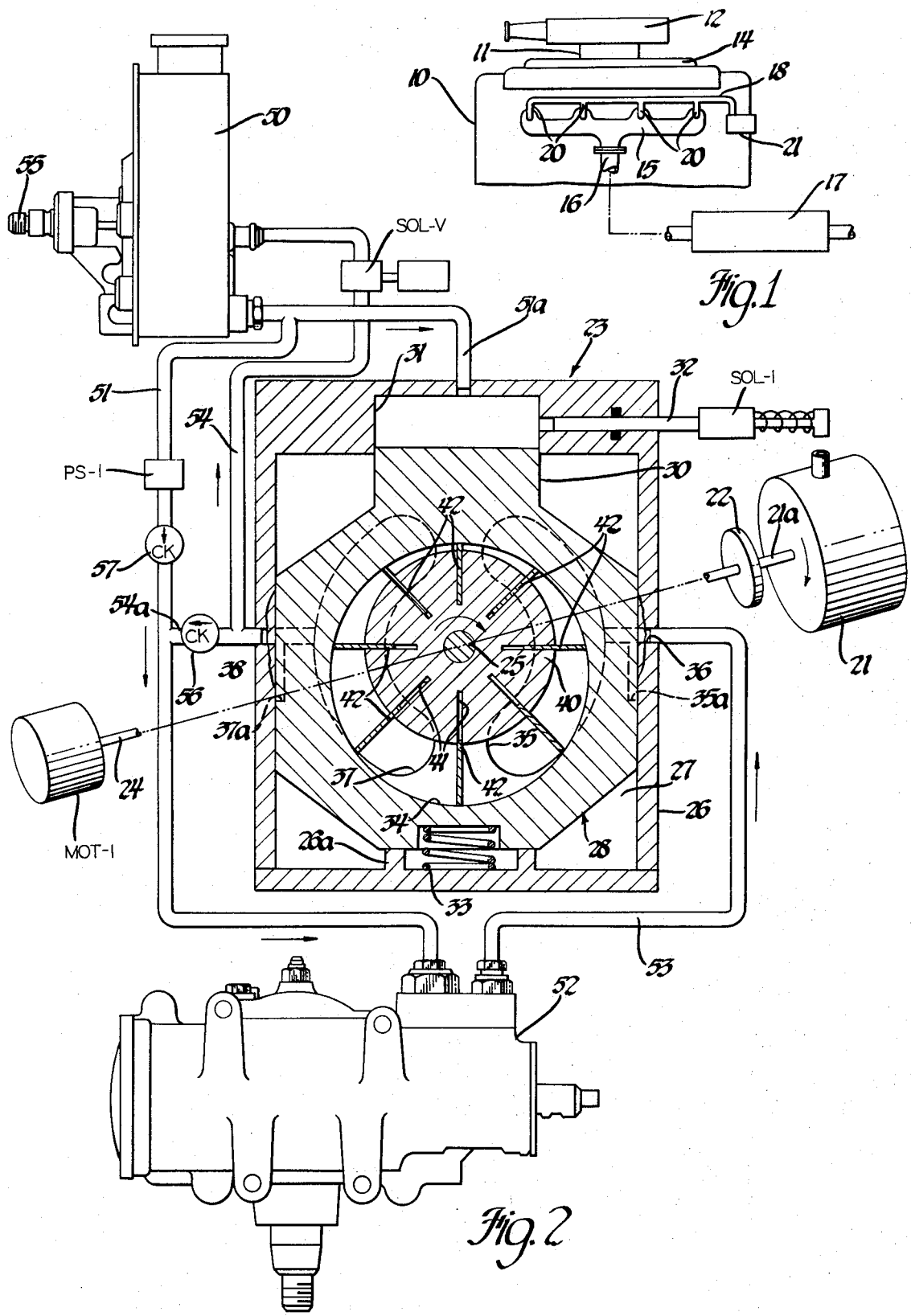

REACTOR AIR PUMP DRIVE SYSTEM

This invention relates to a reactor air pump drive system and, in particular, to a system for driving the air pump of a vehicle air injection exhaust reactor system either by a hydraulic motor or by an electric motor, the latter also being used to drive the hydraulic motor when necessary to provide for reserve power steering of the vehicle.

In recent years, increased emphasis has been placed on reducing the proportion of unburned constituents, such as hydrocarbons and carbon monoxide, present in the exhaust gases emitted from internal combustion engines. One of the most effective arrangements devised to accomplish this reduction in the air injection exhaust reactor system. In this system, an engine driven air pump delivers air to the stream of hot exhaust gases as they are emitted from the engine combustion chambers. Utilizing the heat of the exhaust gases, the injected air supports additional burning of the exhaust gases in the engine exhaust passages to reduce the proportion of unburned constituents in the exhaust gases.

In the prior art air injection exhaust reactor systems, it has been customary to drive the air pump directly from the engine of the vehicle and, this of course meant that the pump speed and therefore its output increased in direct relationship to increases in the operating speed of the engine. However, the air flow requirements to the air injection exhaust reactor system are greatest at low engine speed so that with engine driven air pumps, a valve mechanism was normally required to effect dumping of excess air during high speed engine operation.

It has now also been found desirable on vehicles having an internal combustion engine exhausting through a catalytic converter to effect purging of the catalytic converter after engine shutdown with clean air so as to prepare the catalytic converter for cold start-up at a later time. Without this purge, the catalytic converter does not do its best job, when started cold, to effect cleaning of the exhaust gases introduced therein.

It is therefore the primary object of this invention to provide an improved reactor air pump drive system whereby the air flow from the reactor air pump will be of sufficient value at engine idle conditions and it will not rise to an excessive flow value at high engine speeds.

Another object of this invention is to improve a reactor air pump drive system whereby the air pump can be operated to purge the catalytic converter in the exhaust system of an engine after engine shutdown with clean air.

These and other objects of the invention are attained by means of a reactor air pump drive system in which the reactor air pump is driven through a one-way clutch from a variable displacement hydraulic vane type motor actuated by oil flow in the power steering system of the vehicle, an electric motor being coupled to the rotor of the hydraulic vane motor and being energized when the vehicle ignition is turned off to drive the air pump and effect rotation of the motor rotor without pumping hydraulic fluid, the electric motor also being operable in a reverse direction to drive the hydraulic motor to effect operation of the power steering system of the vehicle in the event of power steering pump failure.

For a better understanding of the invention, as well as other objects and further features thereof, reference is had to the following detailed description of the invention to be read in connection with the accompanying drawings, wherein:

FIG. 1 is a schematic illustration of the internal combustion engine of a vehicle having an air injection exhaust reactor system associated therewith;

FIG. 2 is a diagrammatic view with parts broken away of a central hydraulic power steering and reactor air pump drive system of a vehicle in accordance with the invention, the parts of this system being shown in a first mode of operation whereby the air pump is being driven by the hydraulic motor during normal engine and vehicle operation;

Figure 3:
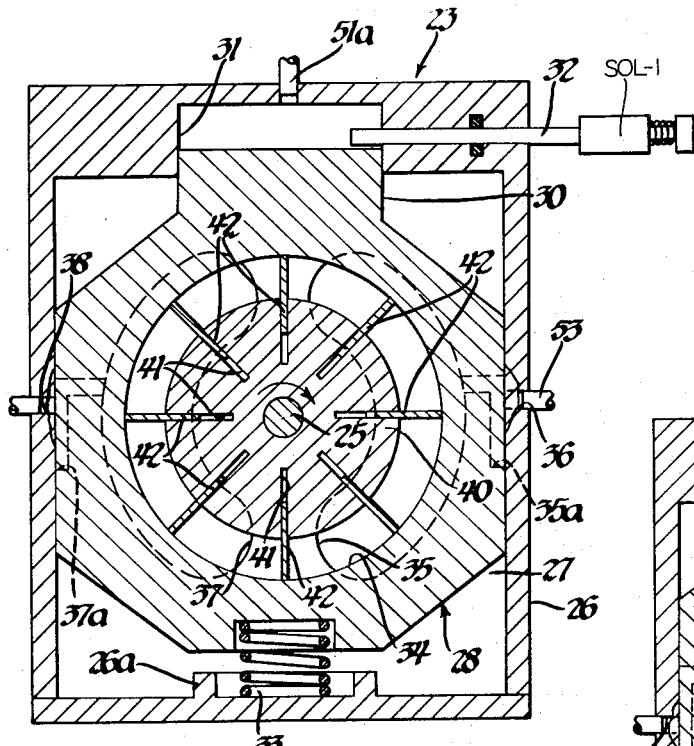
FIG. 3 is a view similar to FIG. 2 but showing the position of the various elements of this system in a second mode of operation to drive the air pump after engine shutdown.

Referring now to FIG. 1, there is illustrated an internal combustion engine 10 which is provided with a carburetor 11 and an air cleaner 12 mounted thereon to supply an air-fuel mixture to the intake manifold 14 of the engine. Each band of cylinders of the engine is provided with an exhaust manifold 15 connected to an exhaust pipe 16 which in turn is connected to a catalytic converter 17. Each of the exhaust manifolds has an air injection or induction unit in the form of an air manifold 18 positioned adjacent to it which is provided with a series of injection tubes 20 extending into the exhaust manifold 15 and terminating downstream of and closely adjacent to the exhaust valve in each of the engine cylinders, not shown, whereby air delivered through these injection tubes is injected into the stream of exhaust gases or combustibles flow paths adjacent to each of the exhaust valves of these cylinders. An air pump 21 is operatively connected to the air manifolds and is driven in a manner to be described to draw clean air from a suitable source and deliver this air to the air manifolds 18.

Figure 4:
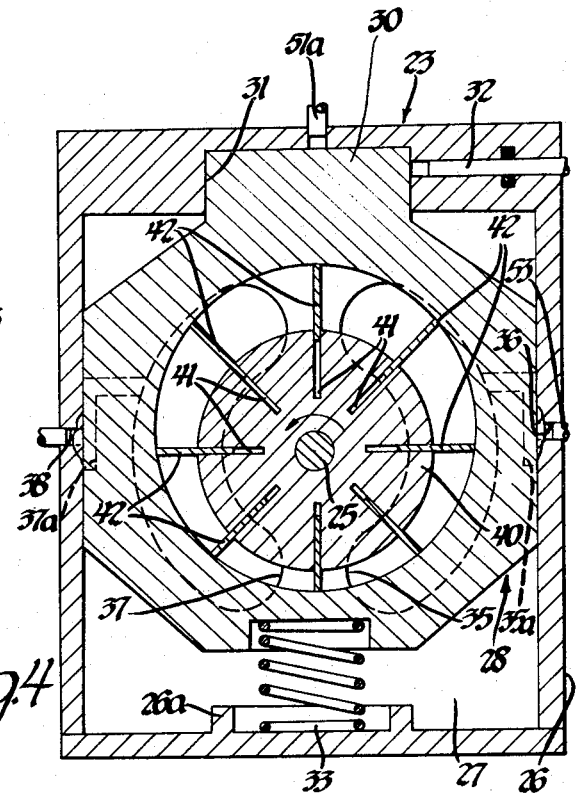
FIG. 4 is a view similar to that of FIGS. 2 and 3 but showing the position of the various elements of the system in a third mode of operation to effect reserve power steering.

With reference now to the subject matter of the invention, and in particular with reference to FIGS. 2, 3 and 4, the air pump 21 is driven in a clockwise direction, as viewed from the input shaft 21a end of the air pump, through a one-way clutch 22 by either an electric motor MOT-1 or by a variable displacement mechanism, generally designated 23, in a manner to be described, the shaft 24 of the electric motor and the rotor shaft 25 of the variable displacement mechanism being operatively connected together in axial alignment with each other, the rotor shaft 25 also being operatively connected to the one-way clutch 22.

The variable displacement mechanism 23 may be of any suitable type but is shown as being of the sliding vane type. As shown, the variable displacement mechanism comprises an outer casing or housing 26 closed at opposite ends by suitable end plates 27, only one of which is shown, and slidably supporting therein a control slide 28, the sides of which slidably engage the side walls of the casing. The upper piston portion 30 of the control slide 28 slidably engages the walls of the chamber 31 formed in the upper portion of the casing 26, the plunger 32 of a solenoid SOL-1 being slidably journalled in the casing whereby upon action of the solenoid SOL-1, the plunger 32 is moved to extend into the chamber 31 to act as a stop for the control slide 28 to limit its upward movement in the casing to the zero displacement position shown in FIG. 3, when desired, for a purpose to be described. A compression spring 33 is interposed between the bottom of the control slide 28 and the bottom wall of the casing 26 to normally bias the control slide 28 upward to the position shown in FIG. 4. The control slide is also provided with a centrally located pumping cavity 34 which is in communication via an inlet chamber 35 and connecting passage 35a in the control slide to an inlet port 36 in the outer casing 26 and via an outlet chamber 37 and connecting passage 37a in the control slide with the outlet port 38 in the outer casing.

The rotor shaft 25 of the variable displacement mechanism carries a rotor 40 that is suitably fixed to the rotor shaft for rotation therewith, the rotor shaft extending through the pumping cavity 34 and is suitably rotatably supported in the end plates of the outer casing. The rotor 40 has a plurality of radially extending slots 41, each carrying a radially extending vane 42. The vanes 42 are radially slidable within the slots 41 so that the outer end of each vane contacts the wall of the control slide forming the pumping cavity 34. The working capacity of the variable displacement mechanism depends on the eccentricty of the rotor 40 with respect to the pumping cavity 34 in the control slide. When the rotor 40 is concentric within the pumping cavity 34, this unit is in effect in a neutral position with zero displacement and can neither operate as a pump or motor. As explained in further detail hereinafter, when the control slide is in the upper position as shown in FIG. 2 in the system disclosed, the variable displacement mechanism is rotated in a clockwise direction to operate as a hydraulic motor whereas when it is in the position shown in FIG. 4, it is driven by the motor MOT-1, in the counterclockwise direction as shown in FIG. 4, to operate as a hydraulic fluid pump, for a purpose to be described.

Now in accordance with the invention, the variable displacement mechanism 23 is incorporated into the central hydraulic steering gear system of an automotive vehicle whereby hydraulic fluid under pressure from this power steering gear system can be used to effect operation of the variable displacement mechanism as a hydraulic motor to drive the air pump 21 during normal engine and power steering gear system operation.

As shown diagrammatically in FIGS. 2, 3 and 4, the power steering gear system includes a primary hydraulic pump and reservoir unit, hereinafter referred to as the primary pump generally designated 50, having its discharge connected by a conduit 51 to the inlet of a hydraulic power steering gear unit 52. Fluid returning from the power steering gear unit 52 is conducted via conduit 53 to the inlet port 36 of the variable displacement mechanism 23. Fluid circularing through the variable displacement mechanism 23, when operating as a fluid motor, is returned via a conduit 54 connected between the discharge port 38 of the variable displacement mechanism 23 and the inlet or reservoir portion of the primary pump 50.

The primary pump 50 is not shown in detail since it can be of generally conventional construction, for example of the type construction as disclosed in U.S. Pat. No. 3,207,077 issued Sept. 21, 1965 to Philip B. Zeigler, Robert P. Rohde and William B. Thompson. This primary pump 50 includes a rotary vane type impeller unit, not shown, driven by an input shaft 55 which is suitably driven by the engine 10. This type pump is basically a constant flow pump.

The power steering gear unit 52 is not shown in detail since it also is of generally conventional construction and may be of the type as disclosed in U.S. Pat. No. 3,022,772 issued Feb. 27, 1962 to Philip B. Zeigler and William Blair Thompson.

As shown, the discharge from the primary pump 50 is also connected by a conduit 51a in communication with conduit 51 to the chamber 31 in the outer casing 26 of the variable displacement mechanism whereby hydraulic fluid under pressure is used to displace the control slide 28 downward to the position shown in FIG. 2. In addition, conduit 51 is also interconnected by a check valve 56 control conduit 54a with the conduit 54 and the discharge port 38 of the variable displacement mechanism 23 and, conduit 51 is also provided with a pressure sensitive switch PS-1 and a check valve 57 positioned in the conduit 51 upstream of the conduit 54a and conduit 54 is also provided with a normally opened solenoid valve SOL-V positioned between the primary pump 50 and the junction of conduit 54 with conduit 54a, all for a purpose to be described.

Figure 5:
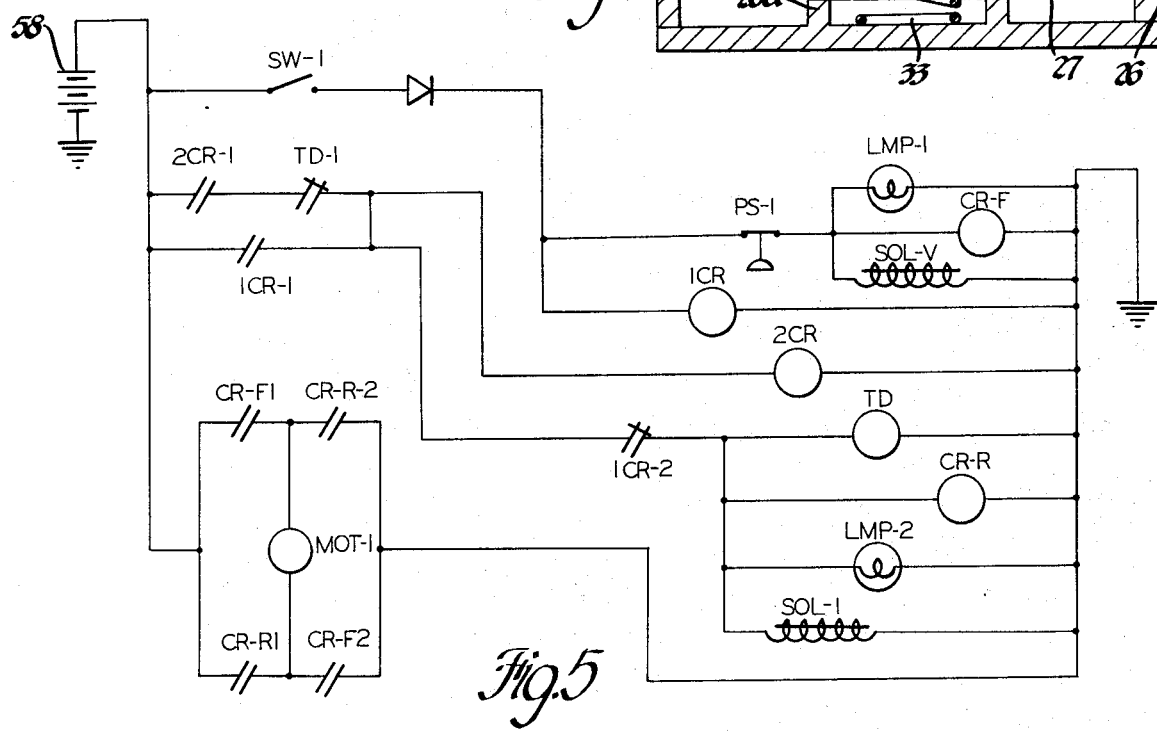
FIG. 5 is a schematic electrical wiring diagram of the system shown in FIGS. 2, 3 and 4.

A clear understanding of the operation of the subject reactor air pump drive system in its various operating modes and of the electrical circuit controlling the various elements of this system can be best obtained by reference to the schematic wiring diagram of FIG. 5 and to the illustrations of the various operating modes of this system as sequentially illustrated in FIGS. 2, 3 and 4. As shown, the various electrical components are energized by a suitable source of electrical power, such as vehicle battery 58.

In the first mode of operation as shown in FIG. 2, since the ignition switch SW-1 in the wiring diagram of FIG. 5 is also used to effect operation of the engine 10, as this switch is closed to start operation of the engine, the primary pump 50 is driven by the engine through the pump input shaft 55 whereby hydraulic fluid under pressure is discharged from this primary pump into conduits 51 and 51a. Hydraulic fluid under pressure flows from conduit 51a into chamber 31 to act against the upper surface of the piston portion 30 of the control slide 28 to force it downward against the biasing action of spring 33 to the position shown in FIG. 2 whereby the variable displacement mechanism will become operative as a hydraulic motor.

With reference specifically to the schematic wiring diagram of FIG. 5, as the ignition switch SW-1 is closed, the control relay 1CR is energized, closing its normally open contact 1CR-1 and opening its normally closed contact 1CR-2. At the same time, with the engine now in operation, the hydraulic pressure in the conduit 51 is sufficient so as to open the normally closed pressure switch PS-1 thereby opening the circuit to the indicator lamp LMP-1, control relay CR-F and to the solenoid valve SOL-V, the latter being a normally open valve. Closure of contact 1CR-1 completes a circuit to energize control relay 2CR to thereby close its contact 2CR-1 which is connected in series with the normally closed contact TD-1 of a time delay relay TD to provide a holding circuit for a purpose to be described after the opening of ignition switch SW-1. With the opening of the normally closed contact 1CR-2, the circuit to the time delay relay TD, the control relay CR-R, the indicator lamp LMP-2 and to the solenoid SOL-1 is broken. With neither the control relays CR-F or CR-R energized, no power is supplied to the motor MOT-1 and accordingly this motor is in effect operatively disconnected from the system although mechanically connected thereto.

In the now first or normal car running mode, hydraulic fluid under pressure is fed from the primary pump 50 to the power steering gear unit 52 and from here by conduit 53 to the inlet port of the variable displacement mechanism 23. The hydraulic fluid then flows through this variable displacement mechanism whereby this unit operates as a hydraulic motor, rotating in the direction shown in FIG. 2 to drive the air pump 21 to the one-way clutch 22. This variable displacement mechanism, operating as a hydraulic motor, uses only a small amount of the pressure available from the power steering system of the vehicle to drive the air pump 21. The variable displacement mechanism is operated at full capacity since the control slide 28 is held to its full downward extended position as shown in FIG. 2, the maximum eccentricity to the axis of rotation of the rotor as determined by the stops 26a, as desired, by the hydraulic fluid in chamber 31 acting against the piston portion 30 the control slide 28. The displacement created by the movable slide is easily varied as desired from vehicle model to vehicle model by changing the travel limits of the control slide, as desired. During this mode of operation, the electric motor MOT-1 is also rotated but since it is not electrically operatively connected to the control circuit during this mode of operation, as previously described, it does not act as a generator to load the variable displacement mechanism then operating as a hydraulic motor.

In the second mode of operation, the subject reactor air pump drive system has the capacity for automatically purging the catalytic converter 17 with additional air after engine shutdown. The purpose of this action, as previously described, is to prepare the catalytic converter 17 for cold start-up at a later time. Without this purge with clean air after engine shutdown, the catalytic converter is not capable of doing its best job during initial cold starting. To effect this purging, the motor MOT-1 is used to drive the air pump 21, as shown in FIG. 3, for a predetermined period of time every time after the ignition key is turned off and the engine is shutdown. This short duration run of the air pump after engine shutdown is long enough to prepare the catalytic converter 17 for cold starting but is not too long so as to run down the car battery 58. As shown in FIG. 3, the motor MOT-1 drives the rotor shaft 25 of the variable displacement mechanism 23 and through it, the one-way clutch 22 and air pump 21.

When the ignition switch SW-1 is opened to shut down the vehicle engine 10, the operation of the primary pump 50 also stops, causing a loss of pressure in the hydraulic system including the chamber 31 so that the return spring 33 can effect movement upward on the control slide 28 of the variable displacement mechanism 23. However, as the ignition switch SW-1 is opened, the control relay 1CR becomes de-energized allowing its contact 1CR-1 to open and allowing its normally closed contact 1CR-2 to close. As this occurs, a circuit is completed through the previously closed contact 2CR-1, the normally closed contact TD-1 of the time delay relay TD and the now closed contact 1CR-2 to energize control relay CR-R to close its contacts CR-R1 and CR-R2 to complete the electrical circuit to motor MOT-1 to effect its operation to rotate the rotor 40 and air pump 21 in a clockwise direction, as indicated by the arrow in FIG. 3.

At the same time, solenoid SOL-1 is energized causing its plunger 32 to extend into the chamber 31 to block the upward travel of the control slide to a position wherein the pumping cavity 34 of the control slide is positioned concentrically with the axis of rotor shaft 25 and rotor 40 so that rotation of the rotor does not impose any great load on the motor MOT-1. The hydraulic fluid in the pumping cavity 34 is merely carried around with no pumping action taking place. During this second mode of operation, the indicator lamp LMP-2, which may be suitably positioned on the dash of the vehicle, is energized.

The above described circuit through the closed contact 2CR-1, time delay contact TD-1 and the normally closed contact 1CR-2 also energizes a time delay relay so that, after a pre-determimed period of time as determined by this time delay relay, it will effect opening of its contact TD-1 thus de-energizing relay 2CR and opening its contact 2CR-1 to effect shutdown of the motor MOT-1 and to de-energize solenoid SOL-1 causing its plunger 32 to retract so that the control slide 28 is free to move, if necessary, to the position shown in FIG. 4.

The subject reactor air pump drive system is also operable in a third mode of operation to provide hydraulic fluid under pressure to effect reserve power steering should the primary pump 50 to fail to pump hydraulic fluid to the hydraulic power steering gear unit 52. Should the primary pump 50 fail to pump hydraulic fluid to the hydraulic power steering unit 52, the motor MOT-1 is activated to drive the rotor 40 of the variable displacement mechanism in a counterclockwise direction as shown in FIG. 4, to operate this unit as a hydraulic pump in a manner to be described with reference to FIG. 4 and the wiring diagram of FIG. 5.

In this third mode of operation, the motor MOT-1 is driven in a direction of rotation so that the one-way clutch 22 disengages whereby the air pump 21 is not driven during this mode of operation. With this arrangement, the power capacity of the motor MOT-1 is then used to operate the visible displacement mechanism 23 as a pump to provide maximum flow of hydraulic fluid to operate the hydraulic power steering gear unit 52.

Since in this mode of operation the primary pump 50 is not operating, hydraulic fluid under pressure is not being forced into the chamber 31 to oppose the action of spring 33, so that the spring 33 can now operate to move the control slide 28 fully upward to the position shown in FIG. 4 to a position opposite that of this element when operating as a hydraulic motor.

Now assuming that the primary pump 50 is not operating when the ignition switch SW-1 is closed, there will be no hydraulic fluid under pressure to cause opening of the contact of the pressure switch PS-1 so that an electrical circuit is completed through the ignition switch SW-1 and the pressure switch PS-1 to energize the control relay CR-F and the solenoid valve SOL-V. As the solenoid valve SOL-V is energized, it will block the flow of fluid in conduit 54 so that hydraulic fluid cannot return to the inlet of the primary pump 50. As the control relay CR-F is energized, its contacts CR-F1 and CR-F2 are closed to complete an electrical circuit to the motor MOT-1 whereby this motor is rotated in a direction to rotate the rotor 40 of the variable displacement mechanism 23 counterclockwise, as shown in FIG. 4, thereby operating this unit as a hydraulic pump. Hydraulic fluid discharged from this pump thus flows from conduit 54a through check valve 56 into conduit 51 for flow directly to the hydraulic power steering gear unit 52, flow in conduit 51 back to the primary pump 50 being blocked by the check valve 57. The system will function in this mode of operation until the primary pump 50 begins to function again to pump hydraulic fluid to the pressure switch PS-1 to effect is opening to de-energize the control relay CR-F and the solenoid valve SOL-V or until the ignition switch is opened which will also open the same circuit. During this third mode of operation, the indicator lamp LMP-1 is energized to indicate to the operator that the variable displacement mechanism 23 is being operated as a hydraulic pump.

Following the above-described third mode of operation, after engine shutdown, the subject system will then operate for a predetermined period of time in the second mode of operation, as described.

In the subject reactor air pump drive system, the reactor air pump 21 when driven hydraulically by the variable displacement mechanism, as disclosed, will provide for a more uniform flow of air as compared to a belt driven air pump driven directly by the engine and, in addition, the electric motor MOT-1 associated with the variable displacement mechanism will operate the reactor air pump, after engine shutdown, to purge the catalytic converter and, the same electric motor can also be used to operate the variable displacement mechanism as a hydraulic pump to provide a hydraulic power reserve system for the power steering system of the vehicle.

What is claimed is:

1. In combination, an internal combustion engine having an air injection exhaust reactor system including an air pump, a primary fluid pump means operatively driven by the engnine, differential fluid pressure actuated means, a variable displacement mechanism having a pumping cavity means movable with respect to the rotor of the mechanism between at least a first fluid displacement position and a zero displacement position as moved thereto by hydraulic means and spring means, respectively, valve controlled conduit means operatively connecting said primary fluid pump means to said differential fluid pressure actuated means in a closed fluid circuit with said pumping cavity means of said variable displacement mechanism operatively connected therebetween, said valve controlled conduit means including a conduit connecting said primary fluid pump means to said hydraulic means of said variable displacement mechanism, one-way clutch means connecting one end of said rotor to said air pump, an electric motor operatively connected to the opposite end of said rotor, an electrical circuit means operatively connecting said electric motor to a source of electrical power electrically connected to said engine to effect operation of said electrical motor for a predetermined time interval in a first direction after engine shutdown to drive said air pump when said pumping cavity means is at said zero displacement position with respect to said rotor, fluid pressure from said primary fluid pump means maintaining said pumping cavity means at said first fluid displacement position with respect to said rotor during engine operation whereby said variable displacement mechanism operates as a hydraulic motor to drive said air pump.

2. The combination according to claim 1 wherein said pumping cavity means of said variable displacement mechanism is movable with respect to said rotor to a second fluid displacement position on the opposite side of said zero displacement position from said first fluid displacement postion by said spring means, solenoid plunger means operatively associated with said variable displacement mechanism and operative in a first mode to permit movement of said pumping cavity means between said first fluid displacement position and said second fluid displacement position and in a second mode to limit movement of said pumping cavity means from said first fluid displacement position to said zero displacement position, and wherein said electrical circuit means includes switch means to effect operation of said solenoid plunger means in said second mode when said electric motor is operated in said first direction and a pressure sensitive switch means operatively connected to said valve controlled conduit means to effect operation of said electric motor in an opposite direction from said first direction to operate said variable displacement mechanism as a hydraulic pump when said pumping cavity means is in said second fluid displacement position.

3. In combinatin, an internal combustion engine having an air injection exhaust reactor system including an air pump, a primary fluid pump means operatively driven by the engine and having an outlet and an inlet, differential fluid pressure actuated means having an inlet and an outlet, a variable displacement mechanism including a housing having an inlet and an outlet, a control slide slidably positioned in said housing and defining with a rotor journalled in the housing a fluid working chamber, said control slide being movable relative to said rotor between a first position, a second position and a third position and defining at one end with said housing a fluid pressure actuator to effect movement of said control slide to said first position, spring means in said housing to normally bias said control slide from said first position toward said third position, one-way clutch means connecting one end of said rotor to said air pump, an electric motor operatively connected to the opposite end of said rotor, a first valve controlled conduit means operatively connecting the outlet of said primary fluid pump means to the inlet of said variable displacement mechanism and to the outlet of said differential fluid pressure actuated means, said first valve controlled conduit means including a conduit connecting the outlet of said primary fluid pump to said fluid pressure actuator, conduit means connecting the outlet of said differential fluid pressure actuated means to the inlet of said variable displacement means, second valve controlled conduit means connecting the outlet of said variable displacement means to the inlet of said primary fluid pump means and including a check valve controlled connected conduit connecting said outlet of said variable displacement means to said first valve controlled conduit means, solenoid plunger means operatively connected to said housing and operative in a first mode to permit movement of said control slide between said first position and said third position and in a second mode to retain said control slide in said second position and electrical circuit means operatively connecting said electric motor and said solenoid plunger means to a source of electrical power to effect operation of said solenoid plunger means to said second mode and of said electrical motor for a predetermined time interval in one direction after engine shutdown to drive said air pump and to operate said electrical motor in an opposite direction when said control slide is in said third position.

* * * * *